United States Patent
Lev et al.

(10) Patent No.: US 7,190,573 B2
(45) Date of Patent: Mar. 13, 2007

(54) CUSTOMIZABLE PORTABLE COMPUTER SYSTEM

(75) Inventors: Jeffrey A. Lev, Cypress, TX (US); Martin A. Mueller, The Woodlands, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 148 days.

(21) Appl. No.: 10/901,340

(22) Filed: Jul. 28, 2004

(65) Prior Publication Data
US 2006/0023409 A1 Feb. 2, 2006

(51) Int. Cl.
G06F 1/16 (2006.01)
(52) U.S. Cl. ...................... 361/683; 361/679
(58) Field of Classification Search ......... 361/679–683
See application file for complete search history.

(56) References Cited

U.S. PATENT DOCUMENTS

| | | | |
|---|---|---|---|
| 5,646,820 A * | 7/1997 | Honda et al. | 361/683 |
| 6,259,409 B1 | 7/2001 | Fulton et al. | |
| 6,538,606 B2 | 3/2003 | Quinn et al. | |
| 6,654,231 B2 * | 11/2003 | Teshima | 361/681 |
| 6,717,801 B1 | 4/2004 | Castell et al. | |
| 6,788,529 B2 * | 9/2004 | Homer et al. | 361/683 |
| 2003/0198010 A1 | 10/2003 | Homer et al. | |

* cited by examiner

*Primary Examiner*—Yean-Hsi Chang

(57) ABSTRACT

A customizable portable computer system comprising a portable computer chassis. A door is detachably attached to the chassis so as to substantially cover an aperture through a wall of the chassis. The door is operable to support an electronic module. The portable computer system also comprises a cable having a first end that is coupled to the computer system and a second end that is accessible through the aperture and operable to couple to the electronic module.

22 Claims, 3 Drawing Sheets

CUSTOMIZABLE PORTABLE COMPUTER SYSTEM

BACKGROUND

Portable computer systems are available with many different electronic modules, such as communication and security modules, as optional accessories. Many of these optional electronic modules are often only available as factory installed accessories, which results in manufacturing and assembly processes that have to be able to supply a variety of system configurations. The supply of a variety of system configurations from a single production line can result in a complex ordering, manufacturing, and logistics system that has to ensure that the customized system for a particular customer is delivered to that customer.

These factory-installed modules may also limit customer flexibility. For example, most factory-installed modules are permanently installed and can not be moved between different systems. Similarly, upgrading an existing system to incorporate modules with different functions or upgraded features may also be difficult, or impossible, with factory installed optional modules. Therefore, as can be appreciated, there is a need for a portable computer system that can be easily customized with optional electronic modules.

BRIEF SUMMARY

The problems noted above are solved in large part by a customizable portable computer system comprising a portable computer chassis. A door is detachably attached to the chassis so as to substantially cover an aperture through a wall of the chassis. The door is operable to support an electronic module. The portable computer system also comprises a cable having a first end that is coupled to the computer system and a second end that is accessible through the aperture and operable to couple to the electronic module.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
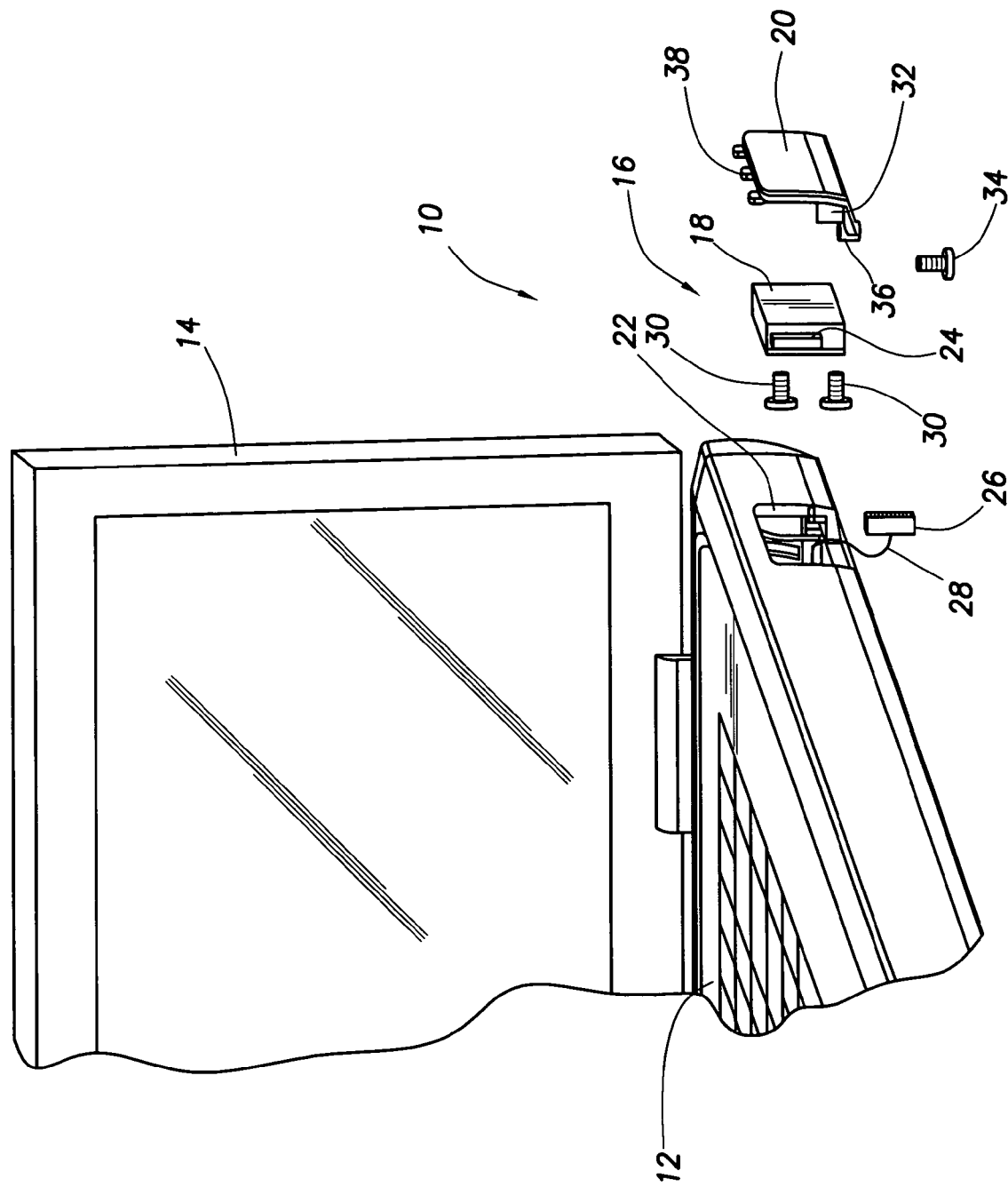
FIG. 1 shows an exploded perspective partial view of a portable computer system in accordance with embodiments of the invention.

Referring now to FIG. 1, a customizable portable computer assembly 10 is shown comprising main chassis 12, display 14, and door 20, which interfaces with portal 22. Electronic module assembly 16 comprises electronic module 18 and mounting screws 30. Module 18 comprises connector 24, which interfaces with plug 26, to provide communication with computer assembly 10 via cable 28. Module 18 mounts to door 20 via mounting screws 30 connecting with threaded mounts 32 on door 20. Door 20 is aligned with portal 22 by tabs 38 and attached to chassis 12 via screw 34, which is held on the door by retainer 36.

Figure 3:
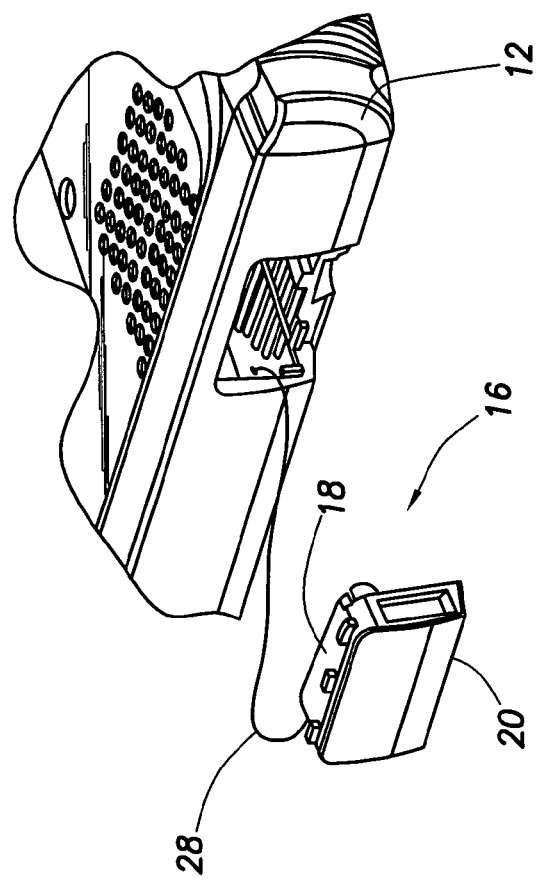
FIG. 3 shows a perspective partial view of the portable computer system of FIG. 1 showing electronic module coupled to the computer system.
Figure 2:
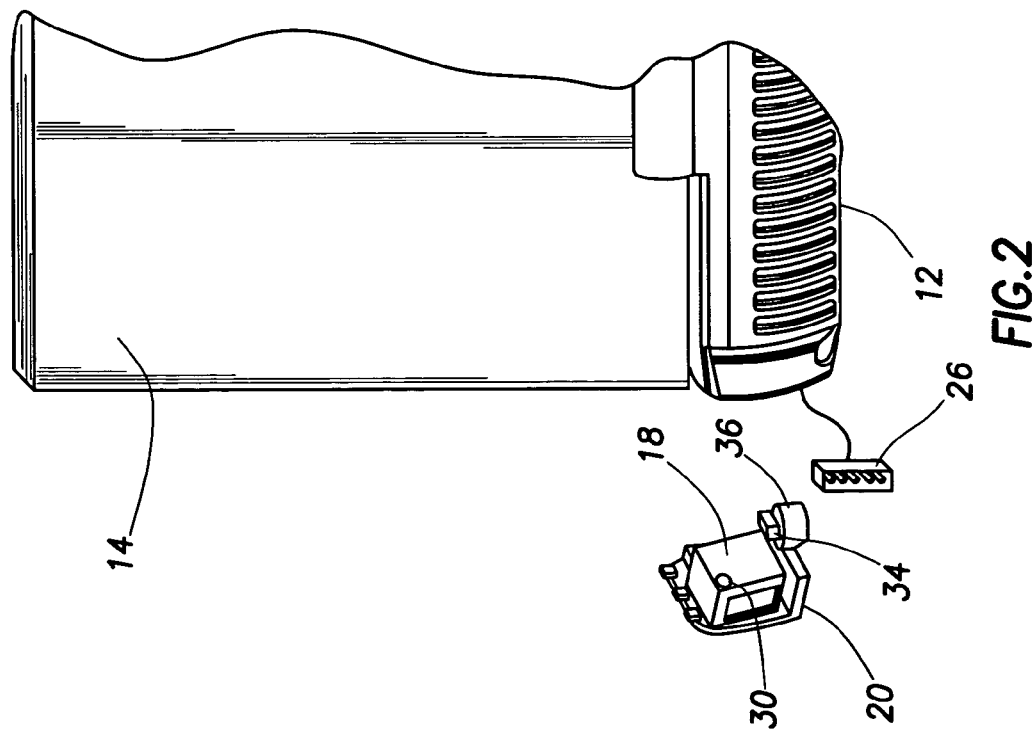
FIG. 2 shows a perspective partial view of the portable computer system of FIG. 1 showing a partially installed electronic module.

To install module 18 into assembly 10, the module is attached to door 18. Referring now to FIG. 2, module 18 is shown attached to door 20 via mounting screws 30. Screw 34 is held by retainer 36 such that the screw remains connected to door 20 even when not attached to chassis 12. Connector 26 interfaces with module 18 to provide communication with the computer system via cable 28, as shown in FIG. 3. Module 18 may also be attached to door 20 via other mechanical attachment systems, such as pins, latches, and clips.

Figure 4:
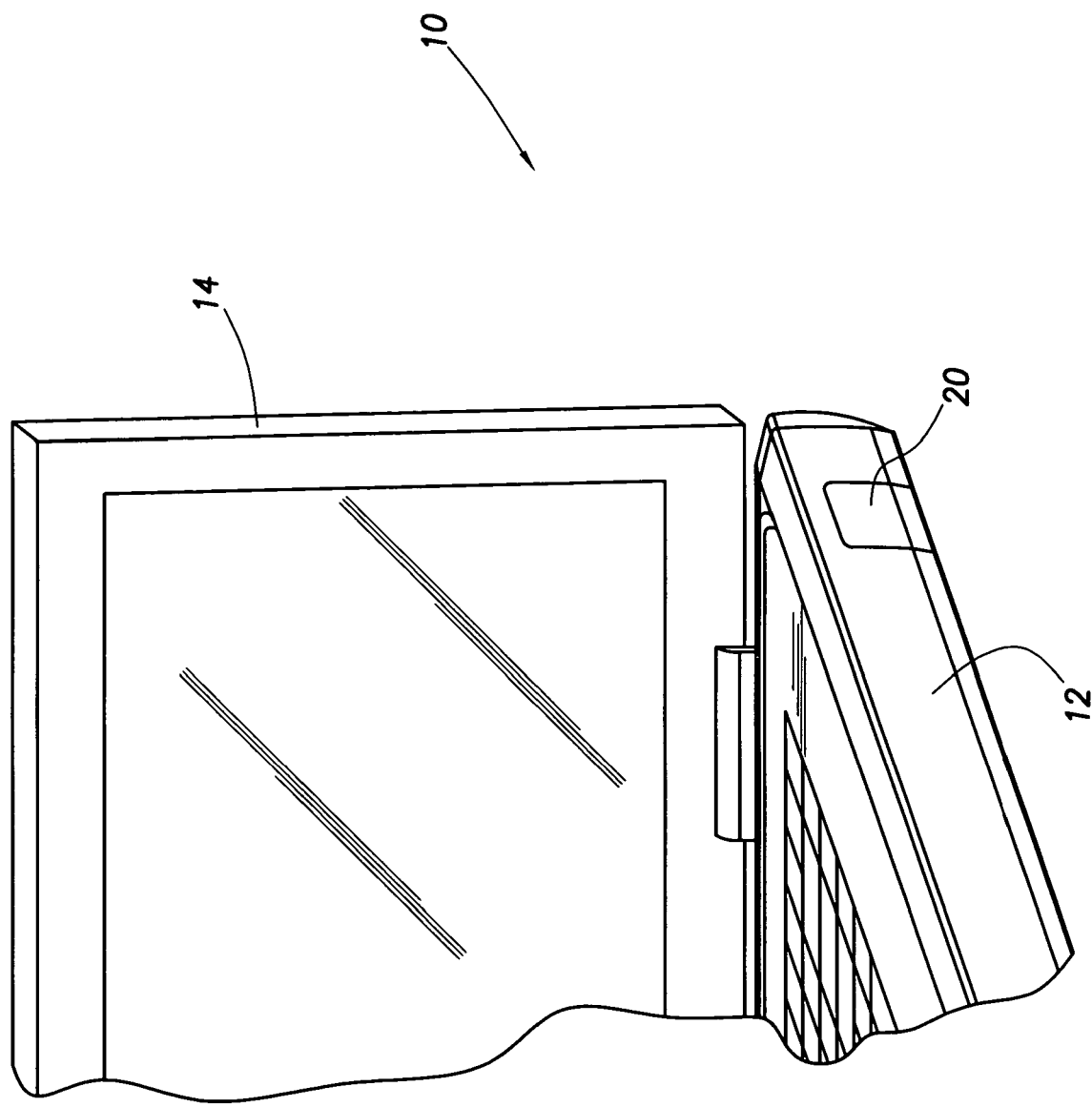
FIG. 4 shows a perspective partial view of the portable computer system of FIG. 1 showing an installed electronic module.

Once module 18 is attached to door 20 and connector 26, the door can be connected to chassis 12, as shown in FIG. 4. With door 20 attached to chassis 12, module 18 is enclosed within the chassis. Module 18 is positioned relative to chassis 12 by door 20. Module 18 is coupled to computer system 10 by cable 28. This configuration of attachment and coupling provides a flexible installation scheme that does not require tight tolerances on the manufacturing of module 18 or chassis 12.

Door 20 may be constructed of injection molded plastic or any other suitable material. Tabs 38 align door 20 to chassis 12 and enable the single screw 34 to attach the door to the chassis. Door 20 may be configured such that, when installed, door 20 appears to be integral to chassis 12, without any protruding features or significant interruptions in the surface of the chassis. Screw 34 is held by retainer 36 such that the screw can not be lost. Door 20 may also be attached to chassis 12 by other mechanical connectors, such as spring loaded latches, slide latches, and multiple screws.

Cable 28 and plug 26 may be a pin-type connector providing power and two-way communication between the computer system and module 18. Cable 28 extends far enough from chassis 12 to allow access for manual engagement of plug 26 and connector 24. The other end of cable 28 is coupled to the system board of the computer.

Module 18 may be any cable-connectable electronic module for use with computer assembly 10. For example, module 18 may be a Bluetooth communications module such as Hewlett-Packard Part No. 348276-001. Other cable-connectable communication modules, such as a modem or an infrared module, may also be used. Cable-connectable security modules may also be used. Module 18 may be keyed such that it can only be installed onto door 20 in one orientation to prevent improper installation.

One exemplary electronic module is a Bluetooth communications module. The integration of Bluetooth modules into portable computer systems has proved problematic because of previous needs to have the antenna on the outside of the system. One Bluetooth module produced by Hewlett-Packard (P/N 348276-001) enables the module to be housed within the portable computer chassis and is equipped with an integral antenna that is specifically tuned to be placed flat against a piece of plastic. The integral antenna of the Bluetooth module is designed and tuned so as to properly operate when disposed at a set distance from a flat, plastic surface. The antenna interacts with the plastic surface to send and receive signals. Thus, in order to operate properly the Bluetooth module must be tightly attached parallel to a flat surface at a set distance.

Providing the removable door assembly, as shown in FIG. 1, provides an alternate arrangement that allows the user to install the Bluetooth module 18 after delivery. Door 20 can be constructed of a suitable injection-molded plastic. Mounting screws 30 and mounts 32 provide tight attachment of door 20 and module 18 at the set offset distance. The portable computer system 10 could be delivered with the injection-molded plastic door 20 installed to effectively act as a cosmetic cover substantially covering aperture 22 in chassis 12. System 10 also ships with cable 28 and plug 26 installed and retained behind door 20.

The Bluetooth module can be provided as an accessory including module 18 and mounting screws 30. Screw 34 is loosened to remove door 18 from chassis 12, opening aperture 22. Screw 34 is captured in door 18 by retainer 36 so that it is not easily lost. Module 18 is keyed to door 18 so that it only installs in one orientation and the integral antenna is placed in the proper relationship with the door. Module 18 is then affixed to door 18 by mounting screws 30. Plug 26 is then coupled to connector 24. Plug 26 and connector 24 may be keyed so as to allow for easy, foolproof insertion.

Door 20, supporting module 18, may then be reattached to chassis 12. Tabs 38 align door 20 and aperture 22. Screw 34 is tightened to securely attach door 20 to chassis 18. Once attached, door 20 substantially covers aperture 22 and may provide a relatively uninterrupted surface for the outside of chassis 12. Bluetooth module 18 is now fully coupled to portable computer system 10 and the system is ready for software installation.

Having a cable-connectable module allows for flexibility in configuration and construction of the portable computer systems. A large number of systems can be built to standardized specifications and individual users can easily add desired modules after receiving their systems. Because a standardized system can be built, manufacturing costs can be reduced and inventory tracking can be simplified. An easily installed module also gives users the option to upgrade and interchange modules as needed to provide desired functionality.

By attaching the module to the door the module only interfaces with the computer system via the cable and provides a loose alignment to the other system boards and the chassis. The module is fixed relative to the door in order to provide a stable attachment, which may be useful in certain applications. Many existing products having user installable components utilize connectors fixed to the system boards of the computer and associated alignment mechanisms to ensure the installable components properly engage the connectors. By eliminating the hard alignment of fixed connectors and their alignment mechanisms, cable-connectable modules allow for looser manufacturing tolerances and more flexible packaging design.

The above discussion is meant to be illustrative of the principles and various embodiments of the present invention. Numerous variations and modifications will become apparent to those skilled in the art once the above disclosure is fully appreciated. For example, the size of the door and aperture may be selected so as to support installation of a variety of cable-connectable modules of any desired size. It is intended that the following claims be interpreted to embrace all such variations and modifications.

What is claimed is:

1. A customizable portable computer system, comprising:
   a portable computer chassis housing the computer system;
   an aperture through a wall of said chassis;
   a door detachably attached to said chassis so as to substantially cover said aperture, wherein said door is operable to exclusively support an electronic module that is detachable from said door and is enclosed within said portable computer chassis when said door is attached to said chassis;
   a connector that detachably attaches said door to said chassis, wherein said connector is accessible from outside said chassis; and
   a cable having a first end that is coupled to the computer system and a second end that is accessible through said aperture and operable to couple to the electronic module.

2. The computer system of claim 1 further comprising the electronic module detachably connected to said door and coupled to the second end of said cable.

3. The computer system of claim 2 wherein said electronic module is fixed relative to said chassis by said door.

4. The computer system of claim 1 wherein said connector is a single screw.

5. The computer system of claim 1 further comprising a Bluetooth communications module detachably connected to said door.

6. The computer system of claim 5 wherein said door further comprises an inner surface and said Bluetooth module further comprises an integral antenna held against the inner surface of said door by a pair of mounting screws.

7. A portable computer system comprising:
   an electronic module disposed within an aperture in a portable computer chassis, wherein said electronic module is coupled to the portable computer system via a cable and enclosed within the portable computer chassis; and
   a door operable to exclusively support said electronic module, wherein said door is detachably attached to the portable computer chassis by a connector and substantially covers said aperture, wherein the connector is accessible from outside the chassis;
   wherein said electronic module is detachable from said door.

8. The portable computer system of claim 7 wherein the cable has a first end connected to said electronic module and a second end coupled to the portable computer system.

9. The portable computer system of claim 7 wherein the cable extends through the aperture when said door is detached from the chassis.

10. The portable computer system of claim 7 wherein the connector is a single screw.

11. The portable computer system of claim 7 wherein said electronic module is a Bluetooth module.

12. The portable computer system of claim 11 wherein said electronic module further comprises an integral antenna held in a close relationship with said door.

13. The portable computer system of claim 12 wherein the integral antenna is inside said door.

14. The portable computer system of claim 7 wherein the relative position of said electronic module relative to the portable computer system is established by the said door.

15. A method for assembling a portable computer system comprising:
   housing the portable computer system in a portable computer chassis;
   coupling a cable to the portable computer system;
   extending the cable to an aperture through the chassis;
   connecting a door to the portable computer chassis such that the door substantially closes the aperture and is integral to the chassis, wherein the cable is disposed within the portable computer chassis and the door is connected with a connector that is accessible from outside the chassis;
   the door exclusively supporting an electronic module that is detachable from said door.

16. The method of claim 15 wherein the connector is a single screw.

17. The method of claim 15 further comprising:
   removing the door from the portable computer chassis to open the aperture;
   attaching the electronic module to the door;
   attaching the cable to the electronic module; and
   connecting the door to the portable computer chassis such that the door substantially closes the aperture and the electronic module is disposed within the portable computer chassis.

18. The method of claim 17 wherein the electronic module is a Bluetooth module having an integral antenna held in close relationship with the door.

19. A computer system disposed within a portable computer chassis comprising:
   means for coupling an electronic module to the computer system without fixing the position of the electronic module relative to the computer system; and
   means for exclusively supporting the electronic module relative to the portable computer chassis, wherein said means for supporting allows access to the electronic module from outside the chassis and enables the electronic module to be detached.

20. An electronic module comprising:
   a cable connector operable to couple the electronic module to a computer system via a cable, wherein the computer system is housed within a portable computer chassis;
   a mechanical connector operable to detachably attach and exclusively support the electronic module to a door, wherein the door substantially closes an aperture through the portable computer chassis such that the electronic module is disposed within the portable computer chassis when the door is detachably connected to the chassis by a connector that is accessible from outside the chassis.

21. The electronic module of claim 20 wherein said mechanical connector maintains the electronic module in a position flat and tight against the door.

22. The electronic module of claim 21 further comprising an antenna that is tuned to be positioned at a fixed distance from the door.

* * * * *